US006906263B2

(12) United States Patent
Kondo

(10) Patent No.: US 6,906,263 B2
(45) Date of Patent: Jun. 14, 2005

(54) CROSSING-WIRE FIXING STRUCTURE

(75) Inventor: Masayuki Kondo, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 104 days.

(21) Appl. No.: 10/451,539

(22) PCT Filed: Apr. 9, 2002

(86) PCT No.: PCT/JP02/03545

§ 371 (c)(1), (2), (4) Date: Jun. 23, 2003

(87) PCT Pub. No.: WO02/084807

PCT Pub. Date: Oct. 24, 2002

(65) Prior Publication Data

US 2004/0026378 A1 Feb. 12, 2004

(30) Foreign Application Priority Data

Apr. 11, 2001 (JP) ....................................... 2001-112892

(51) Int. Cl.[7] ................................................... H02G 3/06
(52) U.S. Cl. ....................................... 174/88 R; 174/93
(58) Field of Search ................................. 174/88 R, 76, 174/93, 94 R

(56) References Cited

U.S. PATENT DOCUMENTS 2,977,672 A 4/1961 Telfer
3,155,809 A 11/1964 Griswold
3,499,098 A 3/1970 McGahey et al.
3,678,437 A 7/1972 Vaden

*Primary Examiner*—Chau N. Nguyen
(74) *Attorney, Agent, or Firm*—Sughrue Mion, PLLC

(57) ABSTRACT

It is a crossing-wire fixing structure 1 that comprises a first wire 12 and a second wire 13, which each have a conductor 10 covered with an insulating coating 11 and which are arranged in such a way as to cross each other, and that also comprises a crossing portion 14, in which the insulating coatings 11 melt and solidify so that the conductors 10 of the first wire 12 and the second wire 13 are in contact with each other, a soft material 15 adapted to cover the first wire 12 and the second wire 13 around the crossing portion 14, a protective film 16 adapted to support the soft material 15 by interposing the first wire 12 and the second wire 13 in a radial direction thereof. The crossing portion 14 is fixed to a predetermined mounting face 17 through the protective film 16. This fixing structure 1 has a through hole 18 provided in the protective film 16 in such a manner as not to interfere with the first wire 12 and the second wire 13, and in such a way as to permit the soft material 15 to be exposed therefrom. The crossing portion 14 is fixed onto the mounting face 17 through the soft material 15 exposed from the through hole 18.

4 Claims, 4 Drawing Sheets

PRIOR ART

CROSSING-WIRE FIXING STRUCTURE

TECHNICAL FIELD

The present invention relates to a fixing structure for fixing crossed wires.

BACKGROUND ART

Hitherto, a conductor fixing jig and a welding apparatus including this jig have been proposed in, for example, JP-A-9-29445 as applications of techniques for welding conductors, which are arranged like a lattice, to one another at intersection points thereof.

As illustrated in FIG. 7, this conductor fixing jig and the welding apparatus including this jig are constructed so that accommodating grooves 53 for positioning and holding conductors 52 on the top surface side of a body 51 of a fixing jig 50 are formed in a lattice-like form, and that through holes 55, into which a pair of chips 54 of a resistance welder or an ultrasonic welder are inserted, are formed at intersection points of the accommodating grooves 53. The conductors 52 are welded to one another while the conductors 52 are press-contacted with one another by being positioned and held in the accommodating grooves 53 by inserting the chips 54 into each of the through holes 55 from both above and below, respectively, during a state in which the conductors 52 are positioned and held in the accommodating grooves 53.

However, the conventional conductor fixing jig and the welding apparatus including this fixing jig described in JP-A-9-29445 have encountered the problems that the fixing jig 50 has no means for mounting the jig 50 on a vehicle and thus should be mounted thereon by using adhesive tape separately prepared, and that an operation of mounting the jig 50 thereon takes time and effort.

DISCLOSURE OF INVENTION

The invention is accomplished in view of the aforementioned problems. Accordingly, an object of the invention is to provide a crossing-wire fixing structure that needs to prepare no additional mounting means and that can be mounted on a vehicle without taking time and effort.

To achieve the foregoing object, according to the invention, there is provided a crossing-wire fixing structure having a first wire and a second wire, which each have a conductor covered with an insulating coating and are arranged in such a way as to cross each other, crossing portions, in which the insulating coatings melt and solidify so that the conductors of the first wire and the second wire are in contact with each other, a soft material adapted to cover the first wire and the second wire around the crossing portion, and a protective film adapted to support the soft material by interposing the first wire and the second wire in a radial direction thereof. The crossing portion is fixed to a predetermined mounting face through the protective film. This fixing structure further comprises a through hole provided in the protective film in such a manner as not to interfere with the first wire and the second wire, and in such a way as to permit the soft material to be exposed therefrom. Furthermore, the crossing portion is fixed onto the mounting face through the soft material exposed from the through hole.

According to such a crossing-wire fixing structure, the crossing portions of the first wire and the second wire are bonded to the mounting face through the soft material forced out from the through hole the protective film when the conductors of the first and second wires are welded to each other. Thus, there is no need for separately preparing additional mounting means, such as an adhesive tape. Moreover, an operation of mounting a fixing jig on, for instance, a vehicle is facilitated.

Further, the through hole may be provided in the edge portion of the protective film. In this case, there is eliminated the fear that the protective film peels off the fixing structure from the edge portion thereof.

The fixing structure may have a concave portion provided in the mounting face so that the soft material exposed from the through hole is accommodated in the concave portion. In this case, the soft material is prevented from spreading around the protective film.

Furthermore, the soft material may be a hot melt.

BEST MODE FOR CARRYING OUT THE INVENTION

Hereinafter, embodiments of a crossing-wire fixing structure are described with reference to the accompanying drawings.

Figure 1:
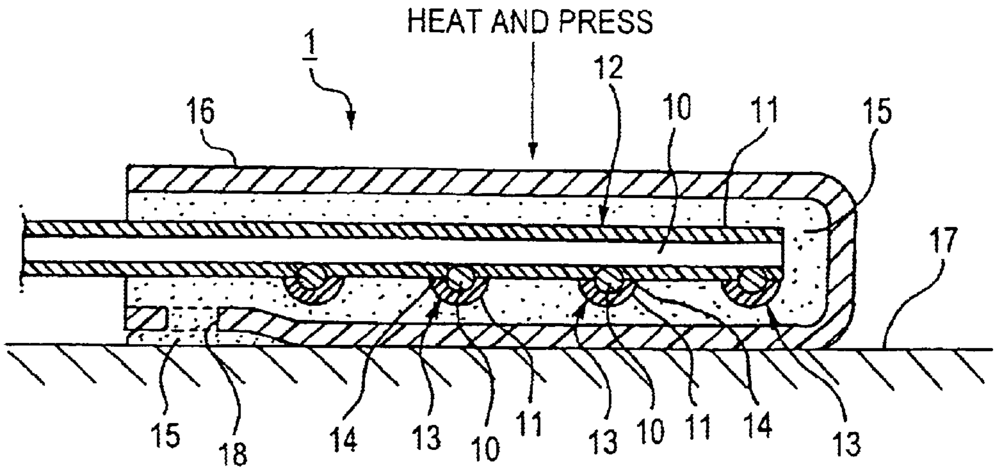
FIG. 1 is a sectional view illustrating a first embodiment of the invention.
Figure 2:
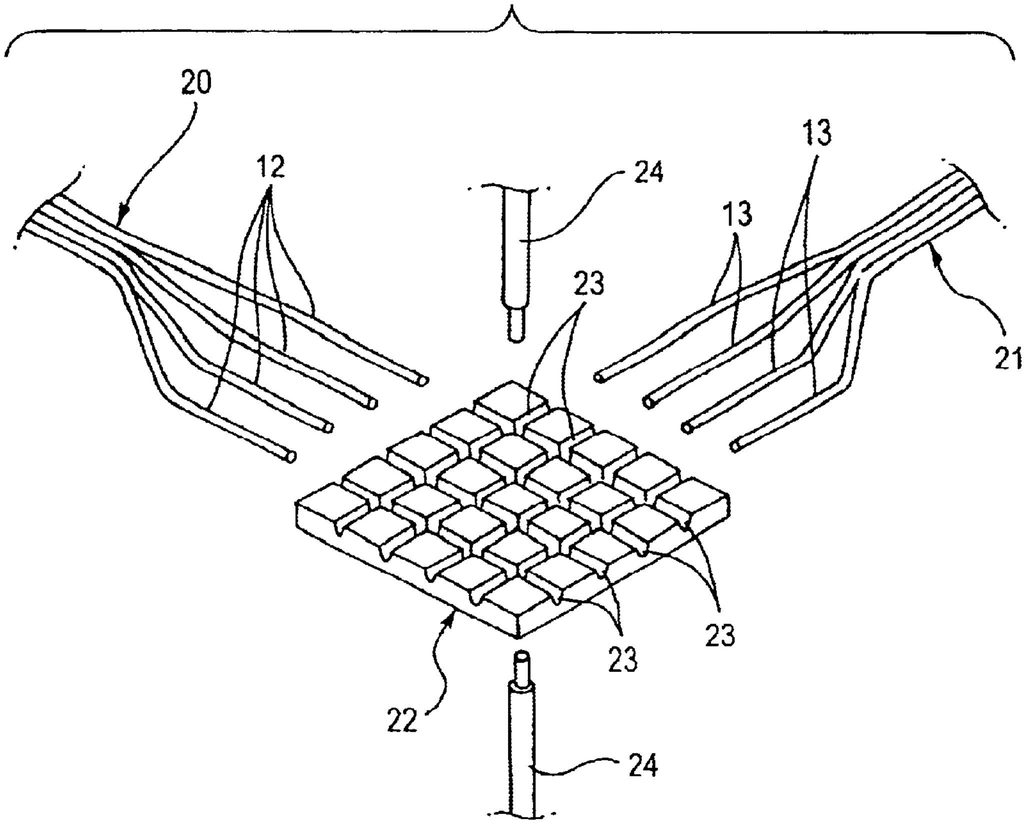
FIG. 2 is a view illustrating a process of constructing the first embodiment of the invention.
Figure 3:
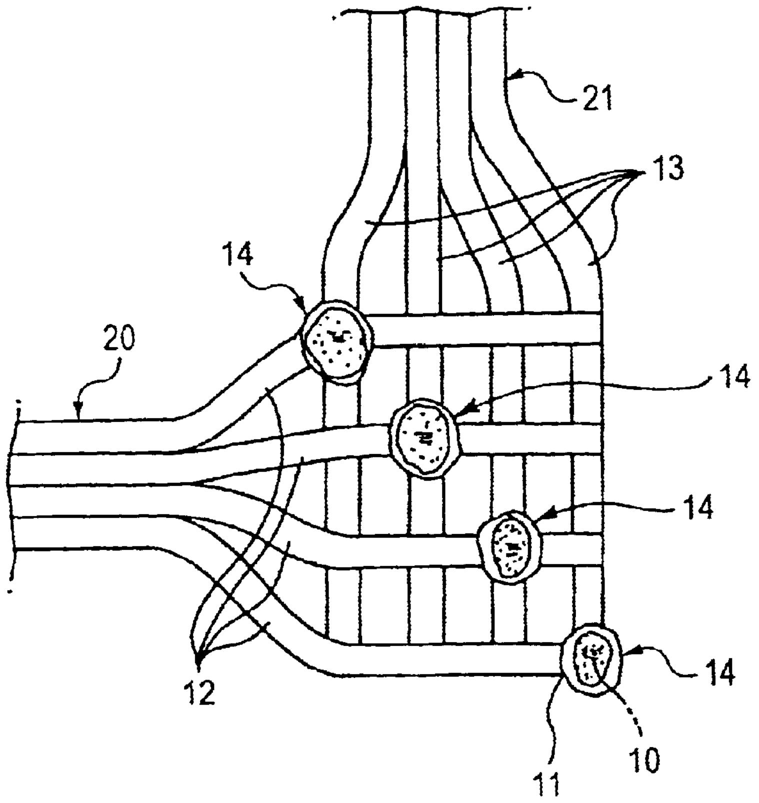
FIG. 3 is a view illustrating a process of constructing the first embodiment of the invention.
Figure 4:
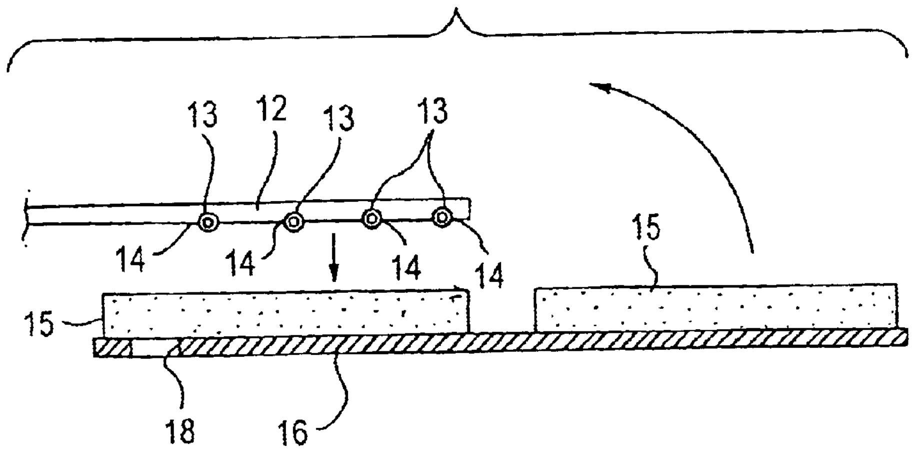
FIG. 4 is a view illustrating the process of constructing the first embodiment of the invention.
Figure 5:
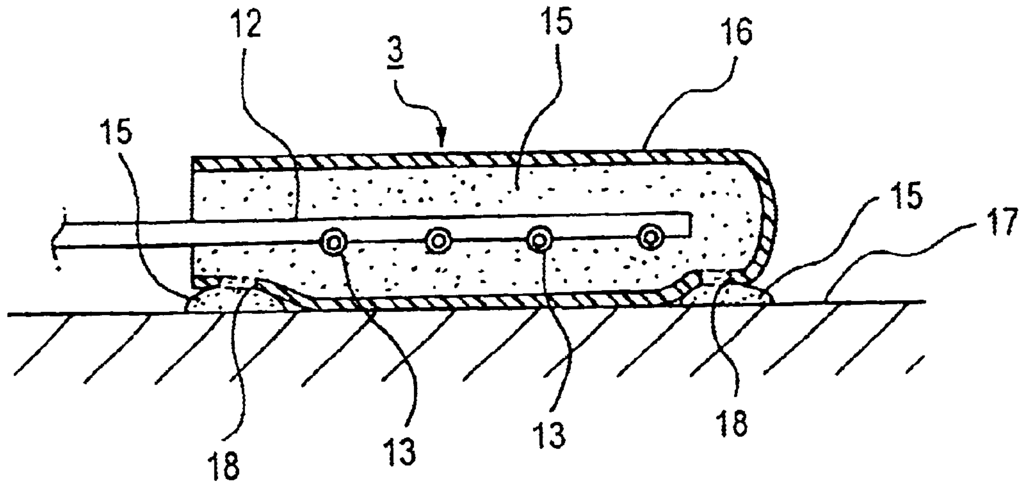
FIG. 5 is a sectional view illustrating a second embodiment of the invention.
Figure 6:
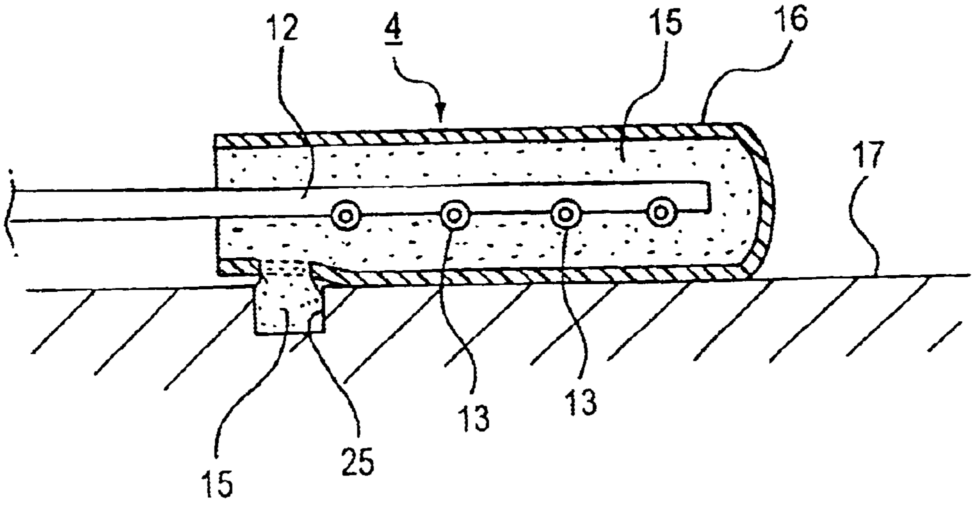
FIG. 6 is a sectional view illustrating a third embodiment of the invention.
Figure 7:
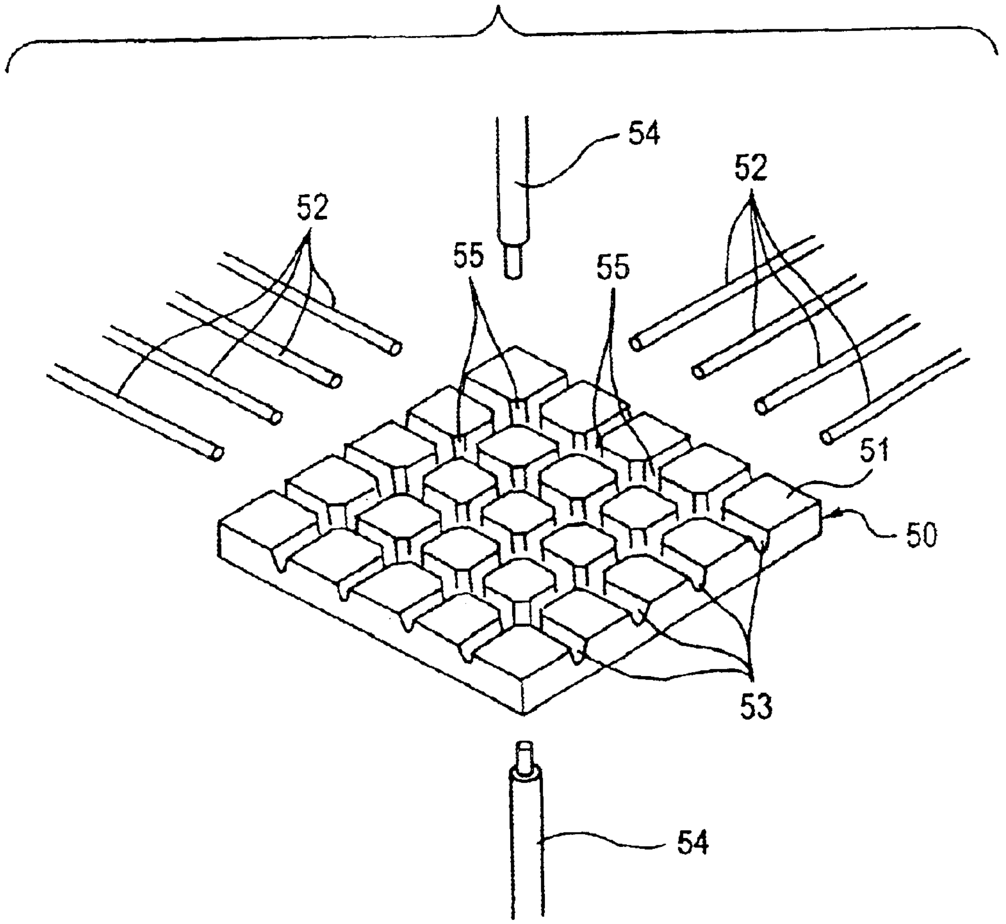
FIG. 7 is a view illustrating a conventional conductor fixing structure and a welding apparatus including this fixing structure.

FIG. 1 is a sectional view illustrating a first embodiment of the invention. FIGS. 2 to 4 are views each illustrating a process of constructing the first embodiment of the invention. FIG. 5 is a sectional view illustrating a second embodiment of the invention. FIG. 6 is a sectional view illustrating a third embodiment of the invention.

First Embodiment

As illustrated in FIG. 1, the crossing-wire fixing structure of the first embodiment of the invention is applied to the case that a crossing portion 14, in which electric wires 12 and 13 cross each other, is fixed to, for example, a predetermined mounting face 17 of a vehicle.

That is, this crossing-wire fixing structure 1 has the first wires 12 and the second wires 13, which each have a conductor 10 covered with an insulating coating 11 and are arranged in such a way as to cross one another, the crossing portions 14, in each of which the insulating coatings 11 melt and solidify so that the conductors 10 of the corresponding first wire 12 and the corresponding second wire 13 are in contact with each other, a soft material 15 adapted to cover the first wires 12 and the second wires 13 around the crossing portions 14, and a protective film 16 adapted to support the soft material 15 by interposing the first wires 12 and the second wires 13 in a radial direction thereof.

Further, this fixing structure 1 further comprises a through hole 18 provided in the protective film 16 in such a manner as not to interfere with the first wire 12 and the second wire 13, and in such a way as to permit the soft material 15 to be exposed therefrom. Furthermore, the crossing portions 14, in each of which the corresponding first wire 12 and the corresponding second wire 13 cross each other, are fixed onto the mounting face 17 through the soft material 15 exposed from the through hole 18. The through hole 18 is provided in an edge portion of the protective film 16.

Next, a method of manufacturing this crossing-wire fixing structure 1 is described hereinbelow. First, as illustrated in FIG. 2, the wires 12 and 13 of two flat cables 20 and 21 to be connected to each other are separated from one another by cutting each of the flat cables 20 and 21 open by a predetermined length from an end thereof, and then inserted into grooves 23, 23 provided in a lattice-like form in a welding jig 22.

Subsequently, each of the crossing portions 14 (see FIG. 1), in each of which the corresponding wires 12 and 13 cross each other, is pushed from both above and below by a pair of chips 24, 24 of a resistance welder or an ultrasonic welder.

Thus, as illustrated in FIG. 3, the conductors 10, 10 of the wires 12, 13 crossing each other in each of the crossing portions 14 are welded to each other. At that time, the insulating coatings 11 covering the conductors 10 melt, so that the conductors 10 are exposed.

Thus, when the welding is performed on the crossing portions 14, 14, in each of which the corresponding wires 12 and 13 cross each other, the interval between each pair of adjacent welded parts is maintained at a constant value by the rigidity of each of the wires 12 and 13. Consequently, the melted parts are prevented from interfering with each other. Upon completion of welding of the wires 12 and 13, the remaining portions of the flat cables 20, 21 are pulled out of the welding jig 22.

On the other hand, as illustrated in FIG. 4, soft materials 15 having a predetermined thickness and a predetermined length are applied onto the protective film 16 having a predetermined length, in which the through hole 18 is provided, at two places. Then, the welded parts of the wires 12 and 13 and surrounding parts are put on one of the soft materials 15. Thereafter, a half part of the protective film 16 is turned up thereby to put the other soft material onto the wires 12 and 13.

Consequently, the wires 12 and 13 are bonded to the protective film 16 through the soft material 15 by a force having a certain degree of strength.

During this state, as illustrated in FIG. 1, the wires 12 and 13 and the protective film 16 are put on the mounting face 17. Then, heat and pressure are applied thereto from above the protective film 16. Thus, the soft material 15 is strongly bonded to the wires 12 and 13. Moreover, a part of the soft material 15 is forced out of the through hole 18 provided in the protective film 16 and bonded to the mounting face 17.

Consequently, the crossing portions 14, 14, . . . , 14, in each of which the corresponding wires 12 and 13 cross each other, are reliably fixed onto the mounting face 17.

Butyl rubber and hot melt may be used as the aforementioned soft material 15. In the case of using butyl rubber, it is sufficient to apply only pressure thereto. However, in the case of using hot melt, it is necessary to apply both heat and pressure thereto.

Further, it is preferable that the through hole 18 is provided at a place in such a way as to avoid contact with the wires 12 and 13.

Thus, according to the crossing-wire fixing structure 1 of the invention, the crossing portions 14, 14, . . . , 14, in each of which the corresponding wires 12 and 13 of the flat cables 20 and 21 are welded to each other, can be fixed to the mounting face 17 by the soft material 15 forced out of the through hole 18 of the protective film 16. Consequently, there is no need for preparing an adhesive tape, which is prepared in the case of using the conventional fixing structure, and an operation of mounting a fixing jig is facilitated.

Further, because the through hole 18 is provided in the edge portion of the protective film 16, the protective film 16 can be prevented from peeling off the fixing structure from the edge portion thereof.

Moreover, the conductors 10 exposed by welding the wires 12 and 13 to each other in each of the crossing portions 14 are coated with the soft material 15 and the protective film 16. Thus, the conductors 10 can be reliably prevented from interfering with each other. Consequently, an occurrence of leak can be prevented. Moreover, waterproofing of the conductors 10 is enabled.

Incidentally, although the protective film 16 is twice-folded in the aforementioned embodiment, it is possible that two protective films 16 are prepared, and that the crossing portions 14, in each of which the corresponding wires 12 and 13 cross each other, are interposed by the films 16 from above and below. Further, in the case that the thickness of the soft material 15 is larger than a total thickness of the first wire 12 and the second wire 13, the soft material 15 may be provided on the protective film 16 only at a place.

Second Embodiment

FIG. 5 illustrates a crossing-wire fixing structure 3, which is a second embodiment of the invention. This crossing-wire fixing structure 3 is configured so that through holes 18 are provided in the protective film 16 at two places, and that when the protective film 16 is folded back, the through holes 18, 18 are disposed at both end portions of the folded-back protective film 16. That is, both end portions of such a protective film 16 are bonded to each other by the soft material 15. The rest of the second embodiment is similar to the corresponding part of the fixing structure 1 that is the first embodiment.

In the case of the third embodiment, the protective film 16 can be prevented from becoming loose. Moreover, the protective film 16 can be strongly fixed.

Incidentally, the through holes 18 may be provided at three places or more.

Third Embodiment

FIG. 6 illustrates a crossing-wire fixing structure 4, which is a third embodiment of the invention. This crossing-wire fixing structure 4 is configured so that a concave portion 25 of a predetermined size is provided in the mounting face 17, and that a part of the soft material, which is forced out of the through hole 18 of the protective film 16, is accommodated in the concave portion 25.

In this case, the part of the soft material, which is forced out of the through hole 18 of the protective film 16, can be prevented from spreading to the outside of the protective film 16. Thus, a good external appearance of the fixing jig can be realized.

Incidentally, although the case of welding end portions of the wires 12 and 13 to each other has been described in the foregoing description of the first to third embodiments, the invention may be applied to the case of welding middle portions of the wires 12 and 13 to each other.

INDUSTRIAL APPLICABILITY

As described above, according to the crossing-wire fixing structure of the invention, the crossing portions, in each of which the corresponding first wire and the corresponding second wire are bonded to the mounting face through the soft material forced out from the through hole the protective film when the conductors are welded to each other. Thus, there is no need for separately preparing additional mounting means, such as an adhesive tape. Furthermore, an operation of mounting a fixing jig on, for instance, a vehicle is facilitated.

Further, in the case that the through hole is provided in the edge portion of the protective film, there is eliminated the fear that the protective film peels off the fixing structure from the edge portion thereof.

In the case that the concave portion is provided in the mounting face, and that the soft material exposed from the through hole is accommodated in the concave portion, the soft material can be prevented from spreading around the protective film. Thus, a good external appearance of the fixing jig can be realized.

What is claimed is:

1. A crossing-wire fixing structure comprising:

a first wire and a second wire, which each have a conductor covered with an insulating coating and are arranged in such a way as to cross each other;

a crossing portion, in which said insulating coatings melt and solidify so that said conductors of said first wire and said second wire are in contact with each other;

a soft material adapted to cover said first wire and said second wire around said crossing portion;

a protective film adapted to support said soft material by interposing said first wire and said second wire in a radial direction thereof, said crossing portion being fixed to a predetermined mounting face through said protective film; and a through hole provided in said protective film in such a manner as not to interfere with said first wire and said second wire, and in such a way as to permit said soft material to be exposed therefrom, wherein said crossing portion is fixed to said mounting face through said soft material exposed from said through hole.

2. The crossing-wire fixing structure according to claim 1, wherein said through hole is provided in an edge portion of said protective film.

3. The crossing-wire fixing structure according to claim 1, wherein said mounting face has a concave portion, and said soft material exposed from the through hole is accommodated in said concave portion.

4. The crossing-wire fixing structure according to claim 1, wherein said soft material is a hot melt.

* * * * *